A. F. ROBERTS.
MACHINE FOR SEALING ENVELOPS.
APPLICATION FILED JUNE 17, 1907.

926,827.

Patented July 6, 1909.
7 SHEETS—SHEET 1.

Fig.1

Witnesses:
Wm. Geiger
H. W. Munday

Inventor:
Albert F. Roberts
By Munday, Evarts, Adcock & Clark
Attorneys

A. F. ROBERTS.
MACHINE FOR SEALING ENVELOPS.
APPLICATION FILED JUNE 17, 1907.

926,827.

Patented July 6, 1909.
7 SHEETS—SHEET 2.

Witnesses:
Wm. Geiger
H. W. Munday

Inventor:
Albert F. Roberts
By Munday, Evarts, Adcock & Clarke
Attorneys

A. F. ROBERTS.
MACHINE FOR SEALING ENVELOPS.
APPLICATION FILED JUNE 17, 1907.

926,827.

Patented July 6, 1909.
7 SHEETS—SHEET 4.

Witnesses:
Wm. Geiger
H. W. Munday

Inventor:
Albert F. Roberts
By Munday, Evarts, Adcock & Clarke,
Attorneys

A. F. ROBERTS.
MACHINE FOR SEALING ENVELOPS.
APPLICATION FILED JUNE 17, 1907.

926,827.

Patented July 6, 1909.
7 SHEETS—SHEET 5.

A. F. ROBERTS.
MACHINE FOR SEALING ENVELOPS.
APPLICATION FILED JUNE 17, 1907.

926,827.

Patented July 6, 1909.
7 SHEETS—SHEET 6.

Witnesses:
Wm. Geiger
H. W. Munday

Inventor:
Albert F. Roberts
By Munday, Evarts, Adcock & Clarke
Attorneys

A. F. ROBERTS.
MACHINE FOR SEALING ENVELOPS.
APPLICATION FILED JUNE 17, 1907.

926,827.

Patented July 6, 1909.
7 SHEETS—SHEET 7.

Witnesses:
Wm. Geiger
H. M. Munday

Inventor:
Albert F. Roberts
By Munday, Evarts, Adcock & Clark.
Attorneys

UNITED STATES PATENT OFFICE.

ALBERT F. ROBERTS, OF CHICAGO, ILLINOIS.

MACHINE FOR SEALING ENVELOPS.

No. 926,827.  Specification of Letters Patent.  Patented July 6, 1909.

Application filed June 17, 1907. Serial No. 379,368.

*To all whom it may concern:*

Be it known that I, ALBERT F. ROBERTS, a citizen of the United States, residing in Chicago, in the county of Cook and State of Illinois, have invented a new and useful Improvement in Machines for Sealing Envelops, of which the following is a specification.

This invention relates to the construction of machines for sealing envelops, and it is an improvement on the patent granted to me on the 28th day of May, 1901, and numbered 675,111.

The present invention embodies means for feeding the envelops automatically from a pile thereof, so that the machine is more truly automatic than my patented machines.

The invention also embodies other features of improvement which are fully set forth below and illustrated in the accompanying drawing, in which latter:—

In said drawing 25 represents the motor of the machine which may be of any suitable kind, and which in this instance is an electric motor, and 26 is a rheostat for regulating the current. A shaft 27 is driven by the motor and is belted by belt 28 to the fly wheel 29 on shaft 30. Power is taken from shaft 30 by pulley 31 and belt 32 to pulley 33 on shaft 34, and shaft 34 carries a pinion 35 meshing with a gear 36 on shaft 37, and also a pulley 38 belted by belt 39 to pulley 40 on shaft 41. Through these various shafts the moving parts of the machine are actuated.

Figures 2, 3:
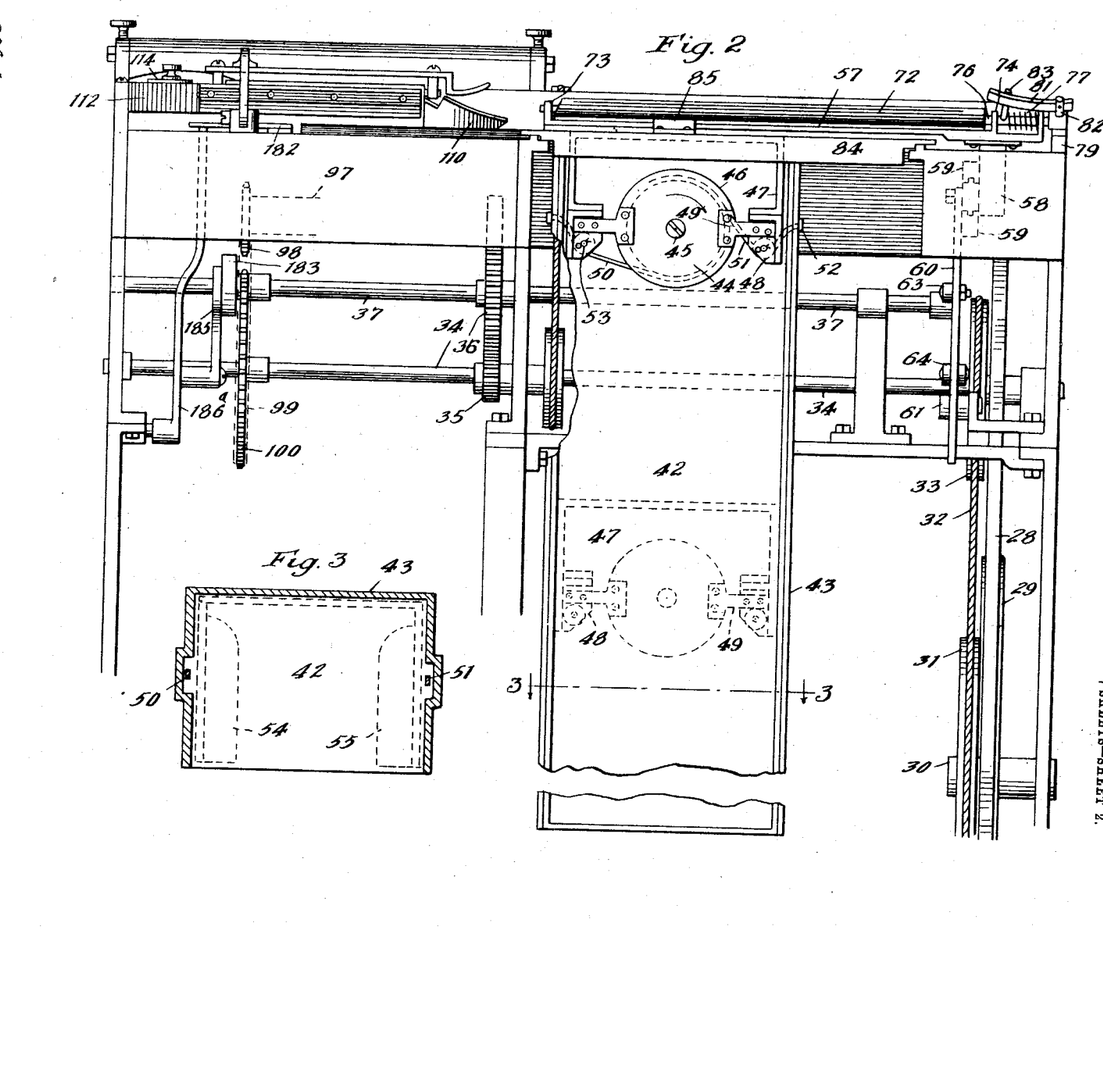
Fig. 2 is a front elevation partly broken away.
Fig. 3 is a section on the line 3—3 of Fig. 2.

The envelops to be operated upon are placed in a pile on a platform 42, moving vertically in a three-sided guide-way 43, and impelled upwardly by a spring winding drum 44 supported on the pivot 45 in a casing 46 secured to the platform by depending legs 47, blocks 48 and braces 49. The drum under the power of spring 44$^a$ winds up two tapes 50 and 51, one winding at the bottom and the other at the top of the drum and approaching the drum from its opposite sides, and both having their ends passed through the walls of the guide way 43 and properly fastened as seen at 52 in Fig. 2. The tapes are preferably passed under rollers or guides 53 in blocks 48 as shown. By employing the two tapes as illustrated, I support the platform equally at both sides and prevent it binding in the guide way, and I am also enabled to wind them both on a single drum. At the top of the guide way or casing I place plates 54, 55, projecting horizontally over the platform and serving to limit the upward movement of the latter and its pile of envelops. By this construction, the drum winds and unwinds both tapes simultaneously and at the same speed, and the platform is caused to rise as the envelops are withdrawn one by one from the pile, and to keep the uppermost envelop pressed up against the stops 54, 55, in position to be drawn off the pile by the feeding devices next to be described. When filling the platform with envelops it is moved down by hand to the position indicated in dotted lines at Fig. 2.

Figure 10:
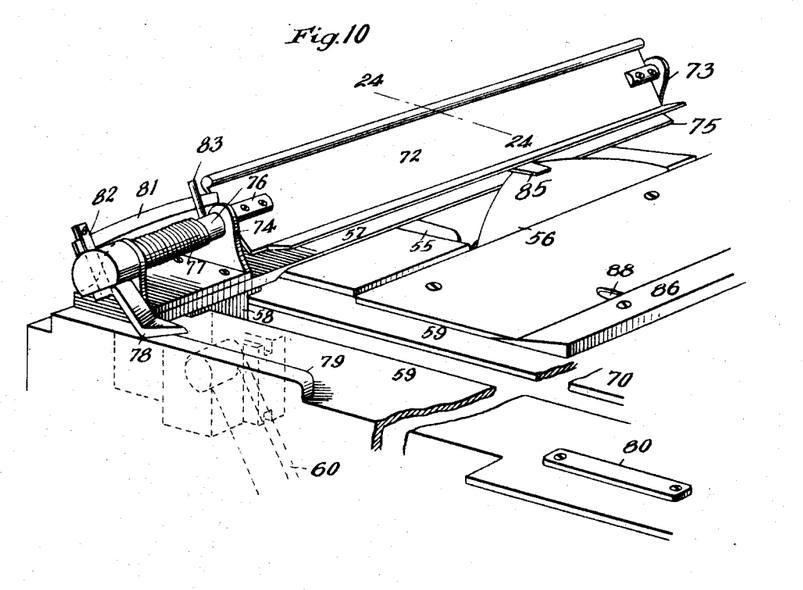
Fig. 10 is a like view of the devices by which the envelops are fed from the pile.
Figure 11:
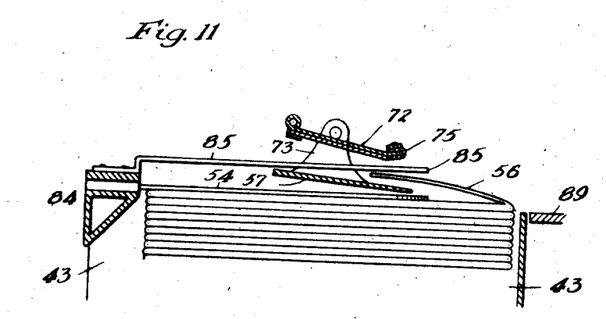
Fig. 11 is a section on the line 24—24 of Fig. 10.
Figure 12:
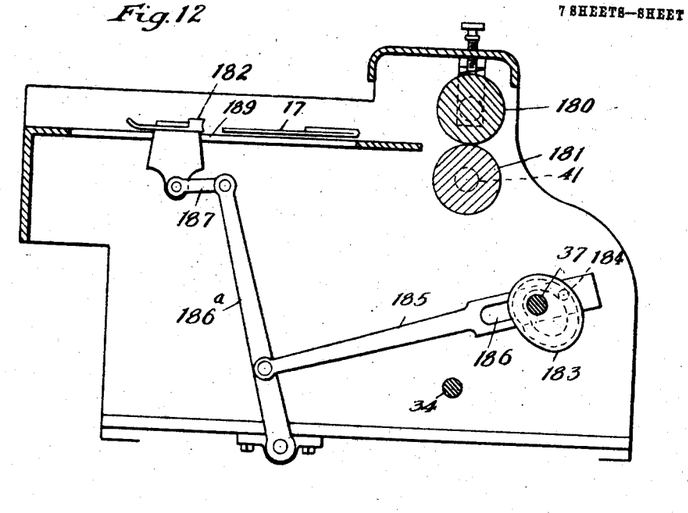
Fig. 12 is a section on the line 12—12 of Fig. 1
Figure 13:
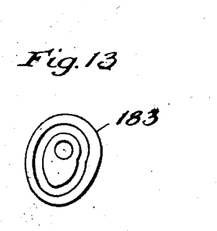
Fig. 13 is a view of one of the cams.
Figure 14:
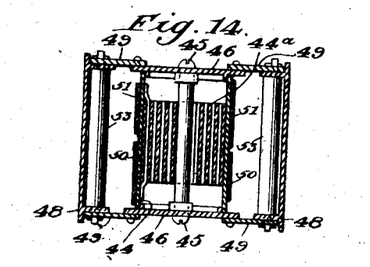
Fig. 14 is a section of the drum for elevating the envelops.

The envelops are placed on the platform 42 with their flaps 56 uppermost as seen at Fig. 10, so that a reciprocating blade 57 may enter under the flaps and by means thereof carry the envelops off the pile one by one in a direction transverse of the envelops and toward the rear of the machine. The blade 57 is attached at one end to a slide 58 riding on the ways 59. Said slide receives a backward and forward motion from the lever 60 supported at its lower end on stationary pivot 61, passing through a slot 62 in the lever, and the lever is actuated from shaft 37 by crank 63 and connecting rod 64. The forward edge of the blade is thin and tilted slightly downward so that it is well adapted to catch under the points of the flaps, and it is shown at Fig. 10 as having just entered under the flap of the top envelop. The forward movement of the blade carries it against the bend at the edge of the envelop, and thus enables it to move the latter off the pile and up against the ledge 71 of the main table 70.

Figure 1:
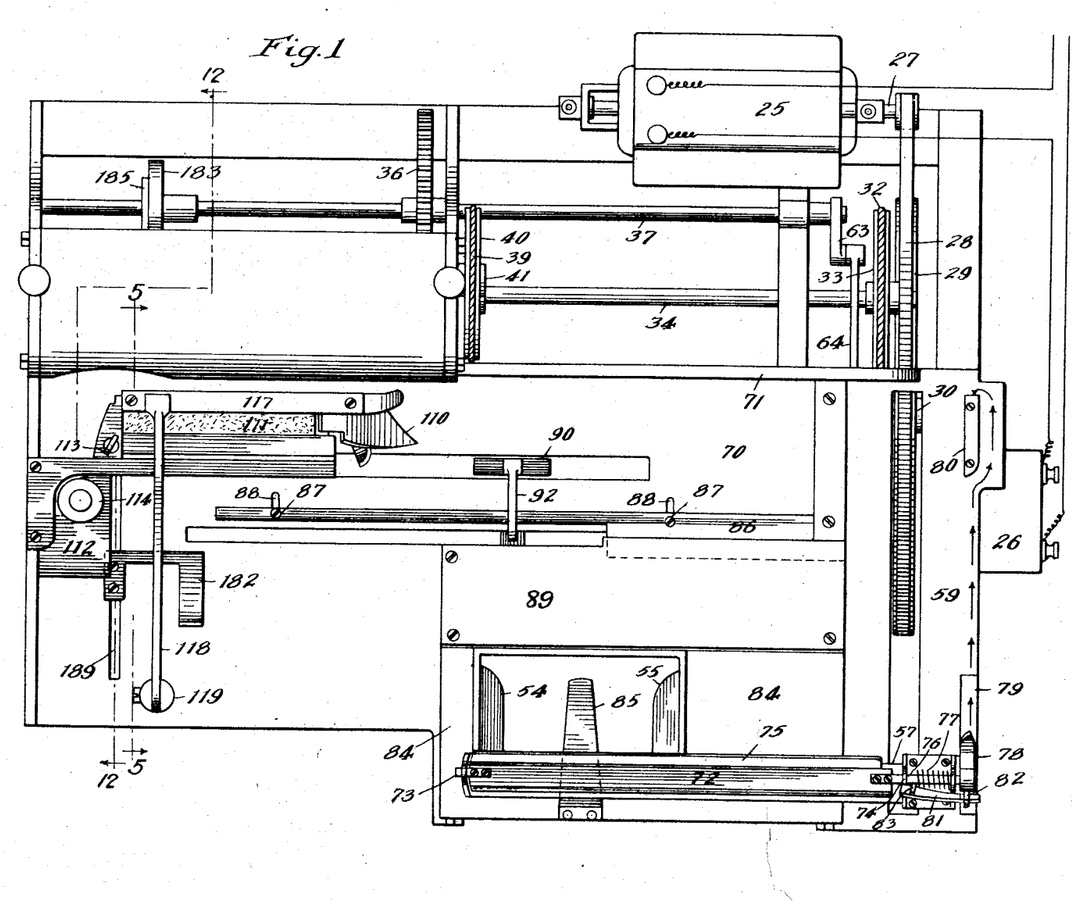
Figure 1 is a plan of my improved machine.

Lest the flap should not have the necessary stiffness to enable the blade to draw it from the pile where it is under some degree of pressure from the platform, I place over the blade a pressure device adapted to clamp the flap down on the blade at the instant the latter reaches the bend at the edge of the envelop. This device is preferably in the form of a plate 72 of metal of substantially the same length as the blade, and pivoted at its ends in uprights 73 and 74 mounted on the blade, so as to permit it to rock in clamping and releasing the flap. Its forward edge is turned upward slightly as seen at 75, and it is rocked at proper times to secure action by it by extending the pivot 76 at the end over the slide 58, so such end may carry a coiled spring 77 and an arm 78. The spring keeps the edge 75 of the plate in acting position except when overcome by the arm, and the arm does this when riding on the raised cam 79 as shown at Fig. 10. As soon as the arm has passed off the cam in the forward movement of the slide, the acting edge of the plate falls under the power of the spring and clamps the flap, and continues this action until the envelop is positioned against the ledge 71. At this time the retreat of the slide commences, and in this retreat the arm 78 is lifted enough to release the flap and allow the feeding blade to move out from under it by a second cam 80. This cam is in the same vertical plane with cam 79, but it will be noticed that the point of arm 78 is beveled off at the side and that the end of cam 80, which the arm encounters in its forward movement, is also beveled, so that instead of riding on said cam during the forward movement the arm is simply deflected laterally thereby until it has passed the cam, when a spring 81 forces it back into the plane of the cam, and thus insures its riding over the cam during the return movement, thus opening the clamp and insuring the release of the envelop. The arm is pivotally secured to the plate pivot 76 to permit this movement around as well as over cam 80, the arm pivot being shown at 82 and forked at its upper end to receive spring 81. The arrows in Fig. 1 show the course of the arm relative to cam 80, and the pin 83 acts to store power in spring 81 when the arm is deflected laterally by cam 80.

A plate 84 surrounds the top of the guide way 43 and the stops 54 and 55 are attached to it, as is also a guard 85 which extends inward from the front of the plate over the pile of envelops on platform 42. This guard is located in a plane above the stops 54 and 55, and is thus enabled to enter between the carrying blade 57 and the clamping plate 72 when those parts retreat, and it projects far enough to cover the points of the flaps and prevent them from curling up to an objectionable extent which might prevent the clamping plate from catching them. In other words, the guard restrains the flap points from rising too high and insures action on them by the clamping plate, and it will be noted that such action by the plate takes place as soon as the arm 78 moves off cam 79, and at about the instant the plate clears the guard.

Figure 4:
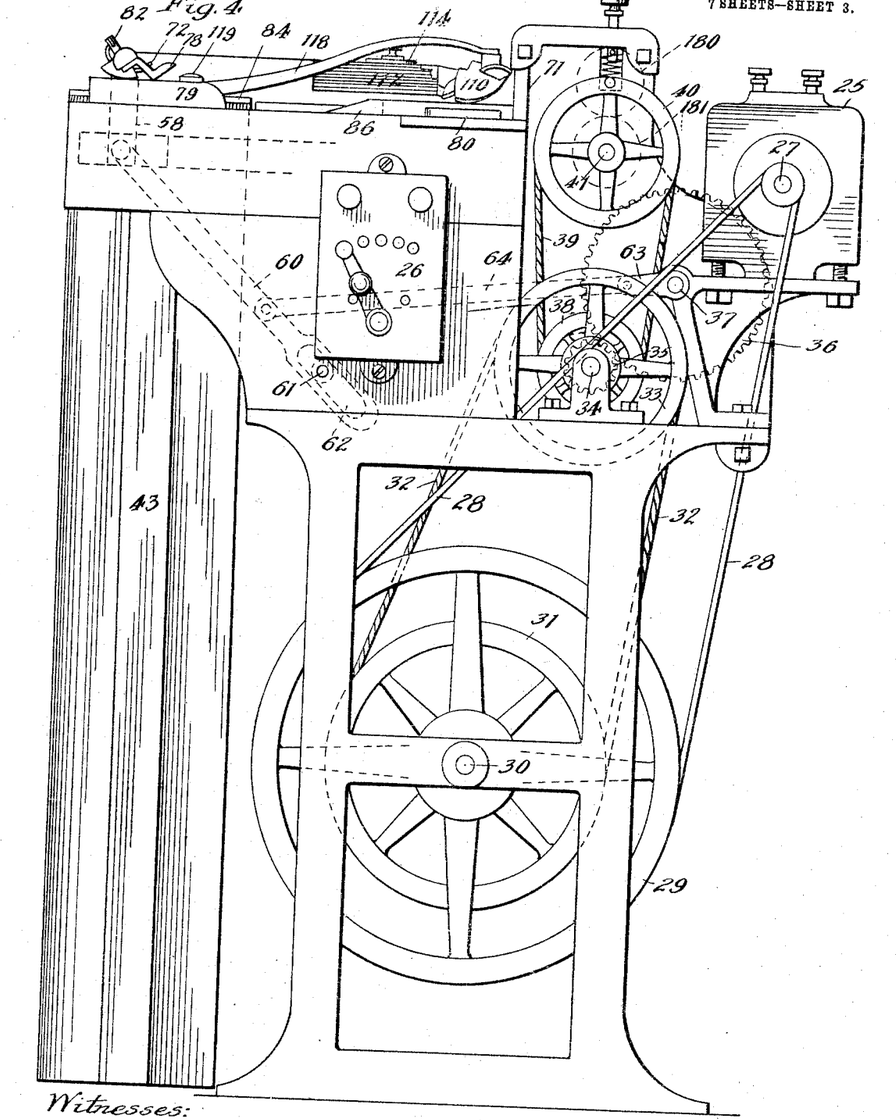
Fig. 4 is an elevation of one end.
Figure 5:
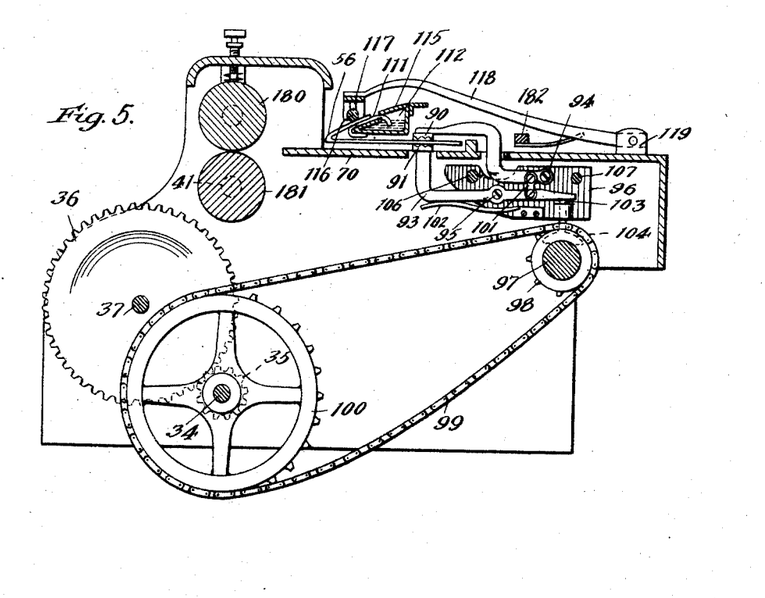
Fig. 5 is a section on the line 5—5 of Fig. 1.
Figure 6:
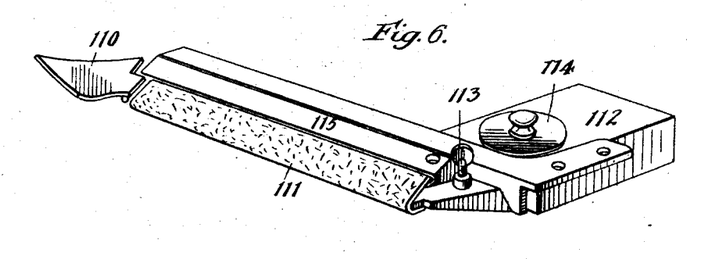
Fig. 6 is a detail perspective of the flap moistener.
Figure 7:
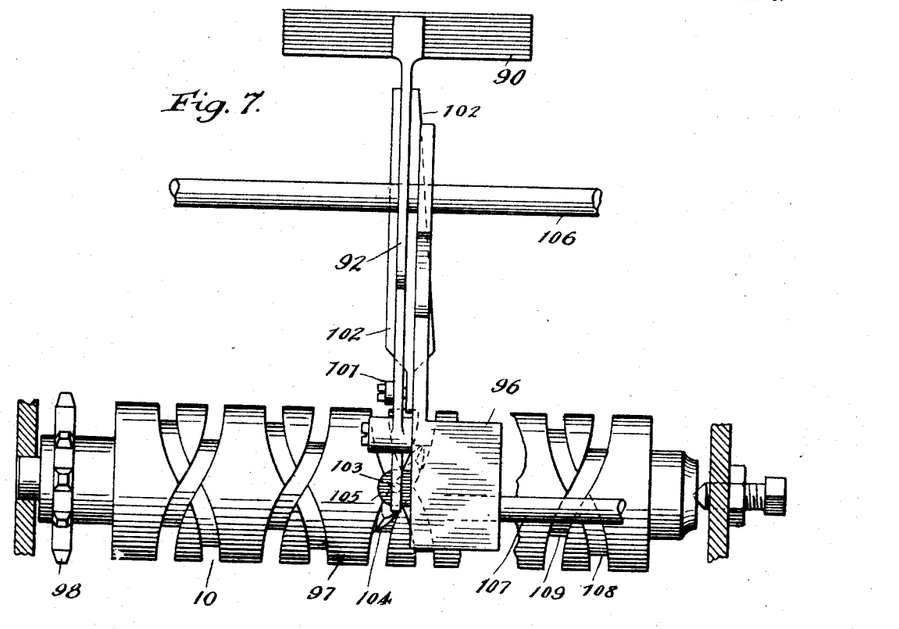
Fig. 7 is a detail plan of the mechanism for feeding the envelop over the flap moistener.
Figure 8:
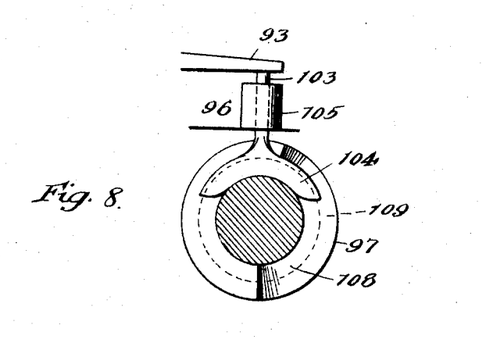
Fig. 8 is a sectional view of the operating screw of said envelop feed mechanism.
Figure 9:
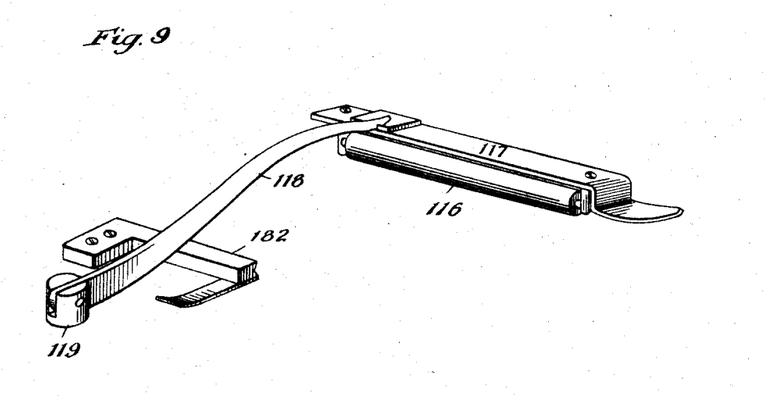
Fig. 9 is a perspective of a portion of the flap moistener mechanism.

As the envelop nears the point of delivery in the forward movement of the feeding mechanism above described, it passes over a bar 86, having an inclined upper surface and an abrupt or vertical surface on its further edge, (see Figs. 4 and 10) and when discharged the envelop falls behind the abrupt edge, and is thus held against any tendency to return with the feeding mechanism. This bar 86 may be adjustable to accommodate different sizes of envelops, its attaching screws 87 passing through slots 88 in the table 70, as plainly shown. A polished plate 89 is preferably placed between plate 84 and bar 86.

After the envelop has been positioned on table 70, as above described, and the transversely feeding blade and clamping plate have retreated, it is seized by other feeding devices and carried longitudinally to the flap raising and moistening devices. These longitudinal feeding devices may be such as are described in my said patent, to-wit: Two clamping jaws adapted to be opened and closed and having the proper movement to carry the envelop lengthwise. I have shown these jaws at 90 and 91. They are formed on the ends of levers 92 and 93, extending up through grooves in the table 70 and pivoted at 94 and 95 respectively to a reciprocating carriage 96 moving longitudinally of the machine and actuated by the feeding and reversing screw 97 having sprocket wheel 98 and driven by chain 99 from wheel 100 on shaft 34. The levers are joined together by a link 101 located back of the pivot of one and in front of the pivot of the other, and under one end of lever 93 is placed a lifting spring 102. Under the other end of lever 93 is the stem 103 of a shoe 104 riding in the threads of the screw 97, and this stem is made the medium of moving the carriage 96 by passing it through a boss 105 formed on the carriage. The carriage is supported by and slides upon rods 106 and 107, which are seated at their ends in the framework of the machine.

The screw 97 not only has both right and left hand threads so that it moves the lever carriage in both directions, but it also is adapted to cause the opening of the jaws 90 and 91. This function is imparted to it by making the thread 109 which carries the levers back to their starting position after each operation shallower than the thread 108 which causes their movement in the reverse direction during which they have the envelops in their control. The shoe rises when it enters the thread 109 and lifts the end of lever 93 so as to open the jaws, and when the shoe enters the deeper thread 108 it falls and allows the spring 102 to close the jaws upon the envelop.

At 110 is a flap raiser and 111 a moistener connected to a water reservoir 112 by a passage regulated by a valve the operating stem of which is shown at 113. A removable cap 114 permits the charging of the reservoir with water. The moistener and reservoir are stationary, and the flap raiser is a piece of flat metal, shaped substantially as shown and loosely hinged to the end of the moistener, so that its acting edge rests lightly upon the envelop and is rendered sensitive to engage the flap. The metal part 115 of the moistener, back of the moistening surface, is adapted to admit the water to all parts of that surface, as will be understood. The flap, which is raised by the device 110, moves over the moistener 111, and when the longitudinal movement of the envelop has ceased, is pressed down into contact with the moistener by suitable means, which consist preferably of a roller 116 pivoted to a right angle extension 117 of an arm 118 pivoted stationarily in the stud 119. This roller presses on the flap lightly, being impelled therein by its own gravity and that of its carrying devices, and it is raised when the envelop is being moved by the transversely acting envelop feeder 182 which moves forward and back under the arm 118, lifting the latter during its backward movement and holding it raised for a sufficient time.

The envelop now is ready for the sealing of the flap, which is done by passing it between the sealing rolls 180 and 181, and this movement is imparted to it by the transversely acting feeding device 182. This device is actuated at the proper time to push the envelop into the bite of the sealing rolls by the following mechanism: At 183 on shaft 37 is a small side grooved cam wheel into which enters a pin 184 on a lever 185 slotted at 186 to enable it to encircle and be moved transversely on shaft 37. Lever 185 is joined to a second lever 186ª pivoted at its lower end, and connected at its upper end to a link 187 which is pivoted to a plate 188 depending from the ejector. This plate traverses a slot 189 in table 70.

While I have shown what I deem to be the best construction of the various devices employed in my machine, it will be understood that I do not wish to be limited thereto except in cases where my claims specifically call for the construction shown.

I claim:

1. The envelop feeding machine provided with means for supporting a pile of the envelops and means for drawing them from the pile, one at a time, consisting of a blade adapted to move under and engage the flaps in such proximity to the folded edge of the envelop as to prevent their curling up, and a pressure plate pressing the flaps down upon the blade at the beginning of the movement imparted by the latter.

2. The envelop sealing machine provided with means for supporting a pile of the envelops and means for drawing them from the pile, one at a time, consisting of a blade adapted to move under and engage the flaps, a rocking pressure plate acting to press the flaps down upon the feeding blade at the time of starting the envelops, and means for operating said plate.

3. The envelop sealing machine provided with means for supporting a pile of the envelops, and means for drawing them from the pile one at a time consisting of a blade adapted to move under and engage the flaps, a rocking pressure-plate for clamping the flaps, an arm projecting from the axis of the plate and capable of moving laterally, and cams for lifting and deflecting said arm, substantially as specified.

4. The combination with the rising platform for the envelops and upon which they are positioned with the flaps uppermost, the stops against which the platform lifts the envelops and the mechanism for drawing off the uppermost envelop, of the guard extending over the points of the flaps, substantially as specified.

5. The combination with the opening and closing jaws of the reciprocating mechanism for feeding the envelops longitudinally, of the reversing feed screw connected to and controlling said jaws and having one thread shallower than the other to adapt it to open the jaws, substantially as specified.

6. The combination with the opening and closing jaws of the reciprocating mechanism for feeding the envelops longitudinally, of the reversing feed screw connected to and controlling said jaws and having one thread shallower than the other to adapt it to open the jaws and a shoe riding in the threads of the screw and carrying motion therefrom to the jaws, substantially as specified.

7. The opening and closing jaws for feeding the envelop longitudinally, connected by a link in front of the pivot of one and behind the pivot of the other jaw, a spring pressing on one of said jaws and tending to keep them both closed, and a reversing feed screw mechanically connected to the jaws and adapted to overcome said spring and open the jaws, substantially as specified.

8. The reversing feed screw, having one thread shallower than the other, in combination with a carriage fed thereby, and opening and closing envelop feeding jaws mounted on the carriage and controlled by the screw substantially as specified.

9. The reversing feed screw, having one thread shallower than the other, in combination with the carriage which is fed by the screw, and envelop feeding jaws supported by the carriage and opened by the screw, and closed by a spring, substantially as described.

10. The reversing feed screw having one thread shallower than the other, in combination with a carriage fed by the screw and envelop feeding jaws supported by the carriage and controlled by the screw and receiving therefrom a movement at right angles to the feed movement, substantially as specified.

11. The opening and closing jaws for feeding the envelops lengthwise, of a reversing feed screw mechanically connected to and controlling the jaws and imparting the feed and return movements to them and also serving to open them, substantially as specified.

12. The combination with means for feeding the envelop lengthwise, and means for moistening the flap, of a flap raiser consisting of a freely hinged sheet of metal 110, arranged parallel with the path of the envelop substantially as specified.

13. The combination with the mechanism for feeding the envelops from the pile in which they are arranged with their flaps uppermost, of the guard 85 extending over and preventing objectionable curling by the points of the flaps, substantially as specified.

ALBERT F. ROBERTS.

Witnesses to above signature:
J. M. LE BEAU,
HENRY REUTER.